Jan. 18, 1938.　　　　　J. WITTEK　　　　　2,105,576
HEDGE AND TREE TRIMMER
Filed April 30, 1936　　　　2 Sheets-Sheet 1
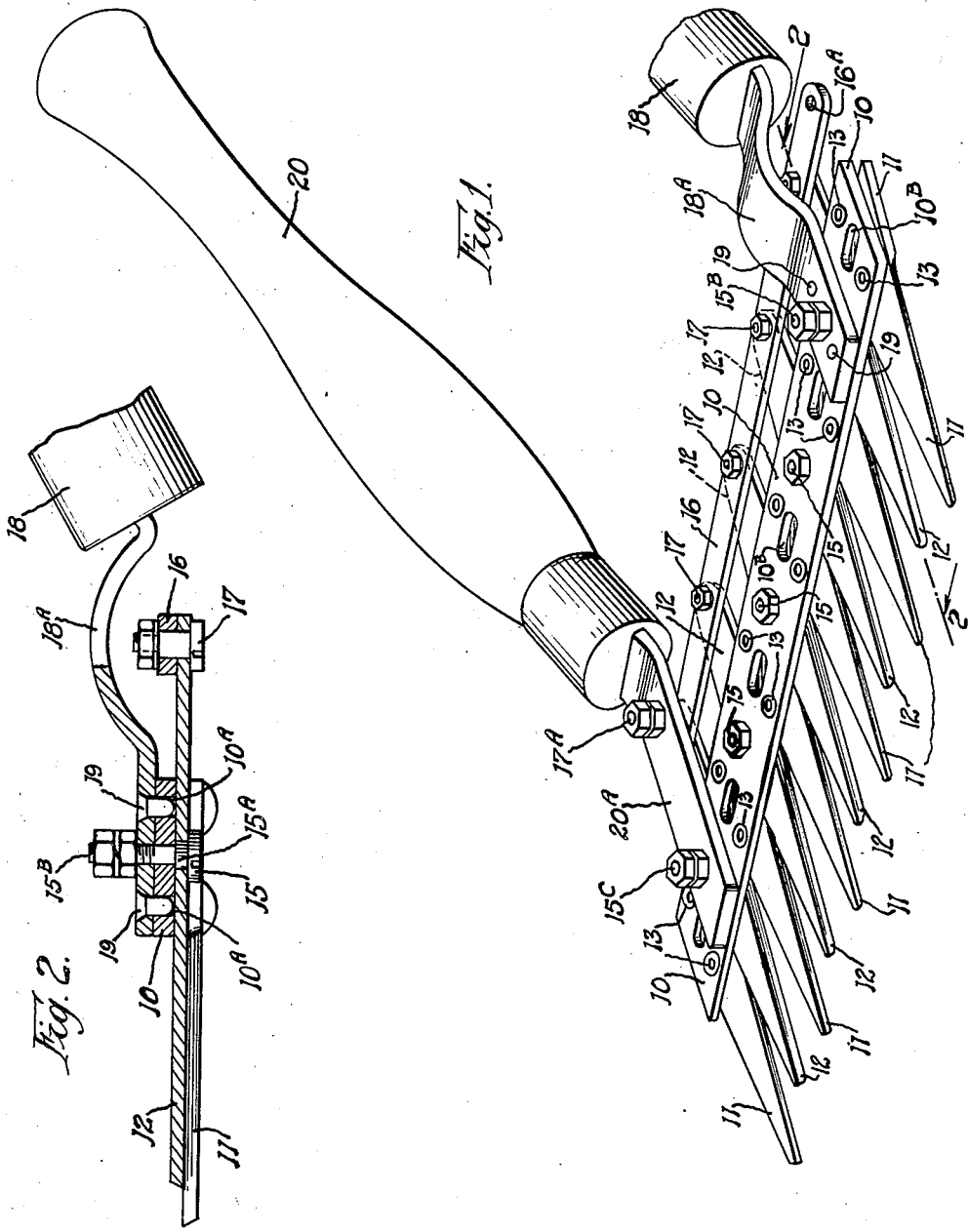
Inventor:
Joseph Wittek,
By: Frank J Schraeder Jr
Attorney.
Witness:
E. Camporini

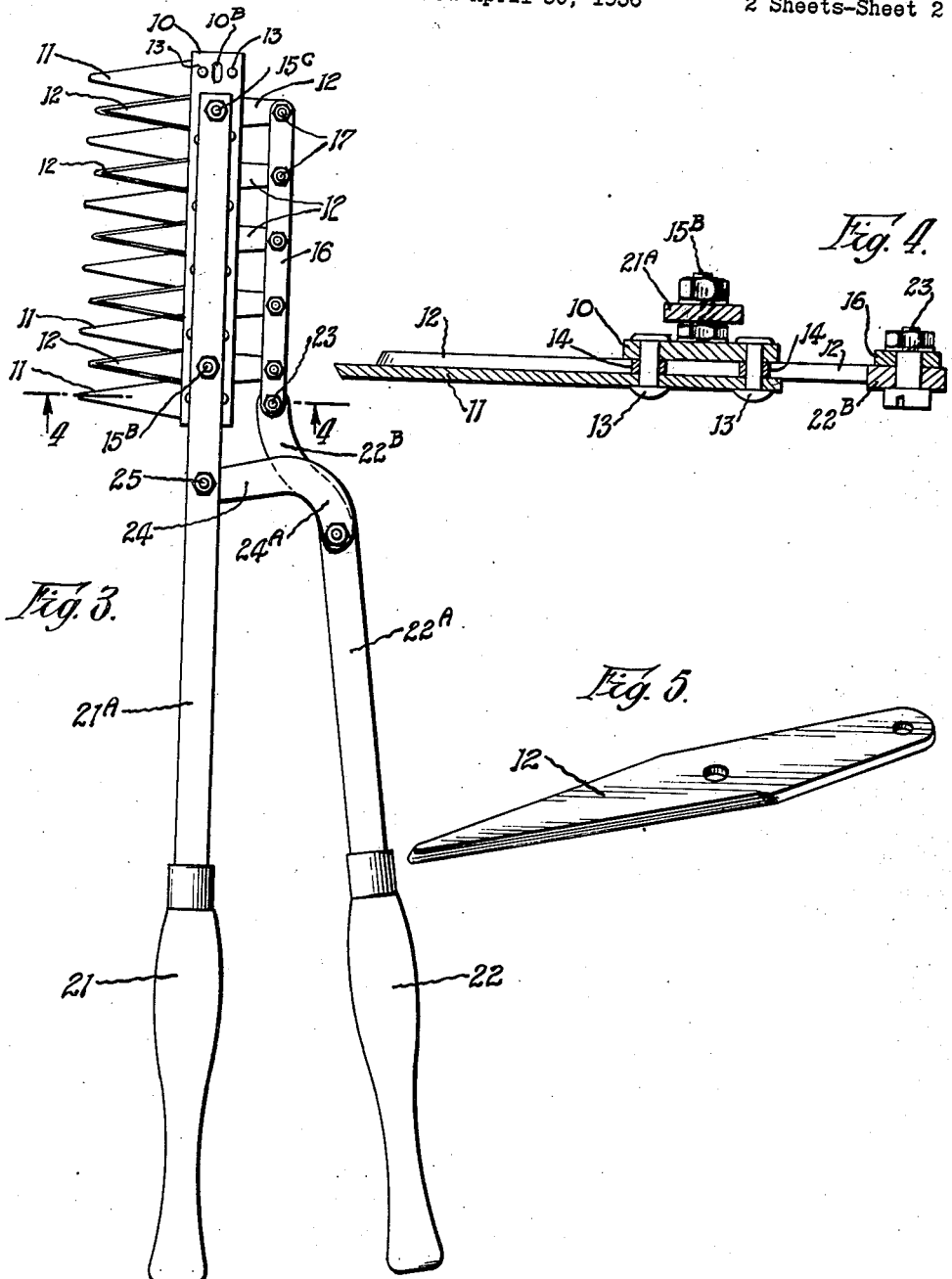

Patented Jan. 18, 1938

2,105,576

UNITED STATES PATENT OFFICE 2,105,576

HEDGE AND TREE TRIMMER

Joseph Wittek, Pasadena, Calif., assignor to Wittek Manufacturing Co., Chicago, Ill., a corporation of Illinois Application April 30, 1936, Serial No. 77,151

9 Claims. (Cl. 30—211)

This invention relates to new and useful improvements in hedge and tree trimmers.

One of the objects of my invention is found in the provision of hedge trimmers or cutters of simple and comparatively inexpensive construction and durable parts including a plurality of simultaneously oscillatable blades cooperating with a plurality of relatively stationary blades. The trimmer having a pair of operating handles one of which is detachably secured in relatively stationary position to the blade support; the other handle being detachably pivotally mounted on the blade support and operatively connected to an oscillatable bar with which the oscillatable blades are connected.

Another object of my invention resides in the provision of a hedge cutter having detachable handles which are readily detachable to permit substitution therefor of an operating device including a pair of elongated handles which are attachable to the blade support and blade-operating bar to thereby adapt the cutter to a tree trimmer thus increasing the scope of usefulness of the device.

With the above and other objects in view, my invention consists in the novel combination, construction and arrangement of the parts and members shown in preferred embodiment in the attached drawings, described in the following specification and particularly pointed out in the appended claims.

In the drawings:

Fig. 1 is a perspective view of a hedge trimmer embodying my invention;

Fig. 2 is a cross-section taken on line 2—2 of Fig. 1;

Fig. 3 is a plan view of the cutter adapted to a tree trimmer;

Fig. 4 is a cross-section taken on line 4—4 of Fig. 3, and

Fig. 5 is a perspective view of one of the oscillatable cutting blades.

The trimming device as shown in Figs. 1 and 2 consists of a support 10 constituting a single flat bar on which are supported the stationary cutting blades 11 and the oscillatable cutting blades 12.

The spaced stationary blades 11 are each secured to the supporting bar 10 by preferably two rivets 13 having spacing washers 14 interposed between the upper face of the blade 11 and the lower face of the supporting bar 10. The thickness of these washers 14 is slightly more than the thickness of the oscillatable cutting blades 12 to permit their oscillating cutting movement over the upper faces of the stationary blades.

It will be noted by reference to Figs. 1 and 2 that the stationary blades 11 are spaced apart, one from the other, and that each blade is rigidly held a fixed distance below the lower face of the bar 10.

The oscillatable spaced blades 12 are each pivotally supported on a shouldered portion 15A of the bolt 15 substantially between the stationary blades 11 and in the plane between the lower face of the support 10 and the upper faces of the stationary blades 11 and, preferably, a limited portion of each blade 11 at its point of pivotal support may slightly overlap the sides of the adjacent stationary blades 11.

Both stationary and oscillatable blades are tapered at their cutting ends and provided with sharpened cutting edges at such tapered portions similarly beveled relatively to their adjacent faces.

The tapered forward ends of the stationary blades 11 preferably extend beyond the ends of the oscillatable blades 12 and the rear ends of the stationary blades 11 align substantially with the rear side of the supporting bar 10.

The oscillatable blades 12 extend beyond the rear side of the bar 10 for pivotal connection through bolts 17 to the oscillatable operating bar 16 which is parallelly disposed to the supporting bar 10.

A handle 18 is removably fixed to the top of the bar 10 by an extended bolt 15B and held against oscillation about bolt 15B by means of pins 19 securely driven into the metallic end 18A of the handle 18 and adapted to project into openings 10A in the bar 10.

The other, or right-hand, handle 20 is oscillatably supported about the extended bolt 15C on its metallic end 20A while the operating bar 16 is pivotally connected to the end 20A by means of an extended bolt 17A.

As clearly shown in Figs. 1 and 2, the metallic end 18A of the left-hand handle is slightly deformed to clear the operating bar 16.

A reciprocating movement of the right-hand handle 20 about its pivot 15C will cause a reciprocation of bar 16 which through its pivotal connection with blades 12 will simultaneously oscillate all of these blades 12 to thereby cause a cutting or shearing operation between these oscillating blades 12 and their associated stationary blades 11.

A plurality of spaced oil holes 10B are provided in the bar 10 through which the surfaces between the moving parts of the blades may be conveniently oiled.

The adaptation of my improved device to a tree trimmer is illustrated in Figs. 3 and 4.

The handles 18 and 20 having been detached from the bolt connections 15B, 15C, and 17A, the tree trimming extended handles 21 and 22 are then connected to the cutter by connecting the metallic bar extension 21A to the blade-supporting bar 10 by the bolts 15B and 15C, and by connecting the metallic bar extension 22A to the end of the operating bar 16 by a shouldered bolt 23 which is inserted through a hole 16A in bar 16 and through the curved or offset end 22B of the bar 22A.

From the illustration in Fig. 3 it will be observed that the left-hand handle 21 is held fixed in relative stationary position to the cutter by bolts 15B and 15C but that the right-hand operating handle 22 is oscillatably mounted on the curved end 24A of the link 24 the other end of which is pivotally secured to the bar 21A by bolt 25.

A reciprocating movement of the handle 22 will cause a reciprocation of bar 16 and blades 12.

I claim:

1. In a device of the kind described, and in combination, a blade-supporting bar, a plurality of relatively stationary spaced cutting blades fixed to said blade-supporting bar in a plane spaced below said blade-supporting bar, an oscillatable cutting blade pivotally mounted below said blade-supporting bar between each pair of said stationary blades, said oscillatable blades being disposed in a plane between said stationary blades and said blade-supporting bar, and having ends extending rearwardly beyond said blade-supporting bar, a reciprocable operating bar pivotally connected with the rear end of each of said oscillatable blades, and a pair of handles connected to the upper face of said blade-supporting bar, one of said handles being pivotally mounted and having a pivotal connection with said reciprocable operating bar for oscillating said oscillatable blades.

2. In a device as embodied in claim 1, and including all of said blades having tapered and sharpened forward ends.

3. In a device as embodied in claim 1, and including all of said blades having tapered and sharpened forward ends, and the tapered ends of said stationary blades extending beyond the tapered ends of said oscillatable blades.

4. In a device as embodied in claim 1, and including all of said blades having tapered and sharpened forward ends, and all of said blades being of material of uniform thickness.

5. In a device as embodied in claim 1, and including said blade-supporting bar having a plurality of spaced openings therein for admitting lubricant to the surfaces of the moving parts of the blades.

6. In a device of the kind described, and in combination, a blade-supporting bar, a plurality of relatively stationary spaced blades riveted to said blade-supporting bar in a plane spaced below said blade-supporting bar, washers on the shanks of the rivets for retaining said stationary blades in spaced position from said blade-supporting bar, an oscillatable blade pivotally supported on said blade-supporting bar between each pair of said stationary blades in a plane between said blade-supporting bar and said stationary blades, all of said blades being of uniform and equal thickness and having tapered forward ends with sharpened edges and the opposite ends of said oscillatable blades being extended beyond the blade-supporting bar, a reciprocable operating bar disposed parallelly to said blade-supporting bar, means for pivotally connecting the rearwardly extended end of each oscillatable blade with said operating bar, a handle rigidly connected to said blade-supporting bar, a second handle pivotally connected to said blade-supporting bar, and means constituting a pivotal connection between said second handle and said operating bar for reciprocating said operating bar by said second handle to thereby oscillate said oscillatable blades.

7. In a cutter having a frame, a plurality of stationary cutting blades mounted on said frame, a plurality of oscillatable cutting blades mounted on said frame and a reciprocable bar connecting said oscillatable blades; an attachment comprising a pair of handles, one of said handles being adapted to be secured rigidly to said frame transversely to the longitudinal axes of said blades, the other of said handles being adapted to be pivotally connected to one end of said reciprocable bar, and a link pivotally connected at its ends to said handles near one end of the cutter.

8. In a device of the kind described, and in combination, a blade-supporting bar, a plurality of relatively stationary spaced cutting blades fixed to said blade-supporting bar in a plane spaced below said blade-supporting bar, an oscillatable cutting blade pivotally mounted below said blade-supporting bar between each pair of said stationary blades, said oscillatable blades being disposed in a plane between said stationary blades and said blade-supporting bar, and having ends extending rearwardly beyond said blade-supporting bar, a reciprocable operating bar pivotally connected with the rear end of each of said oscillatable blades, and a pair of elongated handles adapted to be attached to the cutter to thereby adapt it to trimming of trees, one of said handles being adapted to be fixed to said blade-supporting bar in parallel alignment therewith, the other of said elongated handles being adapted to be pivotally connected to said reciprocable operating bar, and a link pivotally connected at its ends with said elongated handles near the blade-supporting bar.

9. In a device of the kind described, and in combination, a blade-supporting bar, a plurality of relatively stationary spaced blades riveted to said blade-supporting bar in a plane spaced below said blade-supporting bar, washers on the shanks of the rivets for retaining said stationary blades in spaced position from said blade-supporting bar, an oscillatable blade pivotally supported on said blade-supporting bar between each pair of said stationary blades in a plane between said blade-supporting bar and said stationary blades, all of said blades being of uniform and equal thickness and having tapered forward ends with sharpened edges and the opposite ends of said oscillatable blades being extended beyond the blade-supporting bar, a reciprocable operating bar disposed parallelly to said blade-supporting bar, means for pivotally connecting the rearwardly extended end of each oscillatable blade with said operating bar, and a pair of elongated handles adapted to be attached to the cutter to thereby adapt it to trimming of trees, one of said handles being adapted to be fixed to said blade-supporting bar in parallel alignment therewith, the other of said elongated handles being adapted to be pivotally connected to said first-named elongated handle, and a link pivotally connected at its ends with said second-named elongated handle and said reciprocable operating bar.

JOSEPH WITTEK.